United States Patent

[11] 3,568,962

| [72] | Inventor | Hans-Joachim Janssen<br>Hundsmuehlen, Germany |
|------|----------|-----|
| [21] | Appl. No. | 771,828 |
| [22] | Filed | Oct. 30, 1968 |
| [45] | Patented | Mar. 9, 1971 |
| [73] | Assignee | Licentia Patent-Verwaltungs-G.m.b.H.<br>Frankfurt am Main, Germany |

[54] VIBRATION-INHIBITING MOUNTING ELEMENT FOR SMALL ELECTRIC MOTORS
7 Claims, 3 Drawing Figs.

[52] U.S. Cl. ................................................ 248/15,
308/184, 310/51
[51] Int. Cl. ...................................................... F16f 15/04
[50] Field of Search ............................................ 248/15, 14,
17, 18, 20; 310/91, 51; 308/26, 184

[56] References Cited
UNITED STATES PATENTS

| 2,653,063 | 9/1953 | Arndt et al. .................... | 308/184 |
| 2,874,008 | 2/1959 | Orte et al. .................... | 310/51 |
| 3,159,108 | 12/1964 | Mullings ...................... | 248/15 |
| 3,294,458 | 12/1966 | Mishimn ...................... | 308/184 |
| 3,361,914 | 1/1968 | Janssen ........................ | 310/51 |
| 3,459,978 | 8/1969 | Trucks et al. ................. | 310/51 |

FOREIGN PATENTS

| 647,267 | 12/1950 | Great Britain................. | 310/51 |
| 672,657 | 9/1929 | France ........................ | 308/26 |
| 1,243,502 | 9/1960 | France ........................ | 308/184 |

*Primary Examiner* — Marion Parsons, Jr.
*Attorney* — Spencer & Kaye

ABSTRACT: A unitarily constructed mounting element which inhibits the transmission of vibrations from a small electric motor to the device or instrument to which the motor is attached. The element includes at least two zones having differing energy loss factors. One of the zones provides damping to prevent the transmission of high-frequency radial vibrations, while another of the zones serves as insulation to prevent the transmission of low-frequency tangential vibrations.

PATENTED MAR 9 1971  3,568,962

Inventor:
Hans-Joachim Janssen
BY Spencer & Kaye
Attorneys 3,568,962

VIBRATION-INHIBITING MOUNTING ELEMENT FOR SMALL ELECTRIC MOTORS

BACKGROUND OF THE INVENTION

The present invention relates to a vibration-inhibiting element which may be used to mount a small electric motor in a device or instrument, such as a sound-reproducing instrument (tape recorder, phonograph) office machine (typewriter), blower (low-output heating oil burner) or the like.

When a small electric motor is used to drive equipment of the type noted above, it is desirable to maintain the operating noise of the motor below a predetermined level and prevent all the various vibrations caused by the operation of the motor from reaching the equipment.

The principal vibrations which are produced during the operation of a small electric motor are the tangential harmonic vibrations of the stator, which have a frequency which is twice the frequency of the mains, and the normal running noises which propagate radially from the motor axle bearings. If ball bearings are provided as the motor axle bearings, the vibrations so produced are of relatively high frequency.

Prior art attempts to prevent the transmission of these disturbing motor noises or vibrations to the motor-driven device or instrument have invariably resulted in an increase in the dimensions and in the cost of the motor.

For certain types of motor-driven equipment it is desirable to effectively eliminate both radial and axial play in the motor shaft. When them the motors are provided with ball bearings, this play is eliminated by increasing the spring-elastic pressure with which the outer race of the bearing presses against the ball bearings. This increase in pressure increases the friction against the balls at their contact surfaces and thus increases the operating noise of the bearing. As a result, it is necessary to improve the noise damping to match the increase in the running noise level.

SUMMARY OF THE INVENTION

It is an object of the present invention, therefore, to provide a specially constructed, yet simple vibration-inhibiting element which may be used in mounting a small electric motor to a motor-driven device to produce a substantial reduction in the portion of both the 120-Hz. vibrations of the stator and the high-frequency noise vibrations of the ball bearings which reach the motor-driven device so that the noises which are reflected from this device do not exceed a certain predetermined value.

This object, as well as other objects which will become apparent in the discussion that follows, is achieved, according to the present invention, by providing a single unitarily constructed vibration-inhibiting element with a plurality of zones having different loss factors. One of the zones provides damping while another of the zones provides insulation to prevent the radial and tangential vibrations, respectively, from reaching the housing of the motor-driven device.

The term "insulation" as it is used here is intended to denote the insertion of a spring-elastic layer between two components to prevent the transmission of vibrations from one to the other. A prerequisite for optimum insulation is, first, that the characteristic frequency of two adjacent vibrating parts be different by at least the factor of 3 and, second, that the spring-elastic layer provide little inherent damping; that is, that it exhibit a small lost loss factor. Low-frequency vibrations are the ones that are mainly affected by insulation.

The term "damping" is used here to indicate the conversion of vibratory energy into another form of energy, preferably heat. A material used for this purpose should exhibit a high degree of inherent damping; i.e., a high loss factor. Damping is most effective for high-frequency vibrations.

DESCRIPTION OF THE PREFERRED EMBODIMENTS

Figure 1:
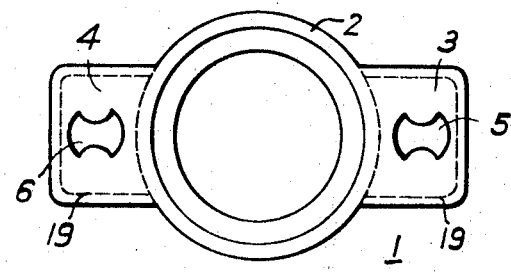
FIG. 1 is an elevational view of a preferred embodiment of the vibration-inhibiting element according to the present invention.

Referring now to the drawings, FIG. 1 illustrates a vibration-inhibiting element 1, consisting of a center portion 2 and side portions 3 and 4. The center portion 2 is shaped to enclose the outer ring of a ball bearing of an electric motor and form a vibration-damping intermediate layer between the ball bearing and the motor mount. The center portion 2 of the vibration-inhibiting element 1 consists of a rubber-elastic material having a low "compression set," a shock elasticity of about 10 percent and sufficient rubber hardness to prevent lateral deviations of the motor shaft even under conditions of great radial stress.

In contrast thereto, the side portions 3 and 4 of the vibration-inhibiting element 1 consist of a rubber-elastic material having substantially lesser rubber hardness and substantially higher shock elasticity. These side portions 3 and 4 serve to absorb and insulate the tangential harmonic vibrational moments of them the motor stator.

The side portions 3 and 4 are provided with openings 5 and 6 which receive correspondingly arranged protrusions that extend from the motor bearing plate. These protrusions, which convey the vibrations of the motor stator, come in contact, on both sides, with only the protruding lateral surfaces of the openings 5 and 6.

The lateral surfaces are shaped in such a way that they alone provide a certain degree of elasticity and thus favorably affect the insulating properties of the side portions 3 and 4.

In a particularly advantageous embodiment of the vibration-inhibiting element according to the invention, the element 1 is constructed—as shown by the broken line 19—with two frames made of the same hard material as the center portion 2. These frames, which enclose the side portions 3 and 4, are injection molded to the center portion 2. The side portions 3 and 4, which may consist of an entirely different and softer material than the center portion 2, are then inserted into these frames.

Figure 2:
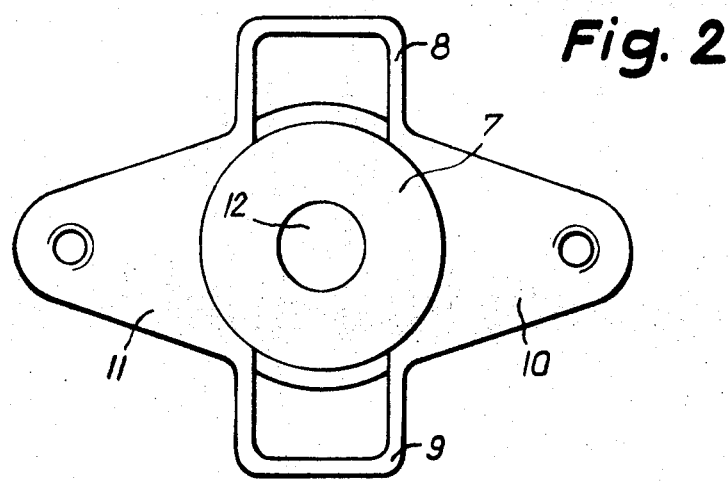
FIG. 2 is an elevation view of a bracket which may be used to mount the element of FIG. 1.

FIG. 2 shows a bracket 7 into which the vibration-inhibiting element 1 (FIG. 1) may be inserted. The edges of side portions 3 and 4 of the vibration-inhibiting element 1 are enclosed and supported by the frames 8 and 9. The wings 10 and 11 serve to fasten the bracket 7 to the housing of the motor-driven device or instrument. The bracket 7 has a disc-shaped indentation in its center for insertion of the center portion 2 of the vibration-inhibiting element 1. After the motor is installed, its shaft will extend through opening 12.

Figure 3:
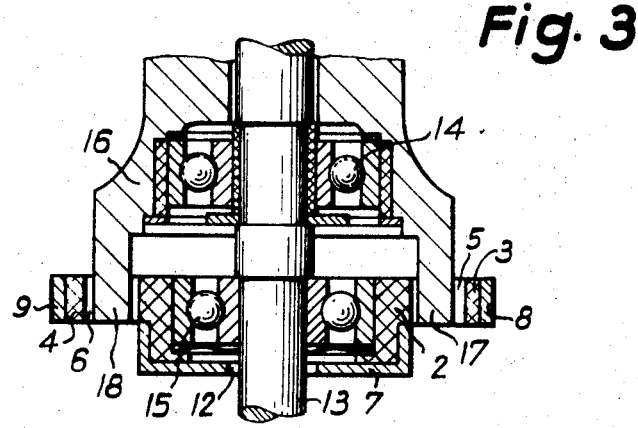
FIG. 3 is a cross-sectional view showing the bearing end of an external-rotor motor and the vibration-inhibiting element and bracket, respectively, of FIGS. 1 and 2.

FIG. 3 illustrates one end of a small electric motor which is to be attached to drive a piece of equipment (not shown). According to FIG. 3, a ball bearing 14 is disposed on the motor shaft 13 and inserted into the bearing plate 16. An additional ball bearing 15 is also pushed onto the motor shaft 13 and serves, in the manner of the present invention, to provide a vibration-free mount between the motor and the equipment housing. This ball bearing is inserted in the vibration-inhibiting element 1 shown in FIG. 1. The bearing plate 16 is provided with protrusions 17 and 18 which extend into the openings 5 and 6 of the vibration-inhibiting element 1. Finally, this element 1 is inserted into bracket 7 which is fastened to the equipment housing.

The arrangement according to the present invention has the advantage, on the one hand, that the particular configuration of the vibration-inhibiting element 1 prevents the transmission of the 120-Hz. harmonic vibrations of the motor stator to the housing of the motor-driven equipment and, on the other hand, that it also damps the operating noises of the ball bearings 15. The side portions 3 and 4 of the vibration-inhibiting element 1 act as return springs to counteract the movements of the protrusions 17 and 18 of the bearing plate 16 and insulate their harmonic vibrations from the equipment housing.

It is also possible to provide more than two protrusions 17 and 18, respectively, as well as corresponding additional insulating members. In order to better utilize the properties of these insulating members, the vibration-inhibiting element 1 can be constructed from a plurality of components consisting of different materials. To further improve the damping and insulating properties of the arrangement it is advantageous to construct the bracket 7 of a soft-elastic synthetic material.

In order to preserve the elasticity of the center portion 2 of the vibration-inhibiting element 1 even under extreme loads, it is advisable to provide the outer surface of the outer race of the ball bearing 15 or the inner surface of the center portion 2 with a plurality of motor-axis-parallel grooves into which the damping material can escape under radially effective compressive stresses. This may also be accomplished by providing motor-axis-parallel grooves on the inner surface of the disc-shaped indentation of the bracket 7.

It will be understood that the above description of the present invention is susceptible to various modifications, changes and adaptations.

I claim:

1. In a vibration-inhibiting element for use in mounting a small electric motor to a motor-driven device by means of a shaft coupling, the improvement comprising: a single unitarily constructed element having at least two zones of differing energy loss factors, one of said zones having an energy loss factor such that the relatively high frequency radial sound vibrations of the motor are dampened and thus prevented from being transmitted to the device and another of said zones having an energy loss factor such that the relatively low frequency tangential vibrations of the motor are insulated from and thus prevented from reaching the device; said one zone of said element being the central portion thereof which is shaped to support a ball bearing for the electric motor shaft; said other zone including at least one side member extending laterally from said one zone and secured thereto, each of said side members having at least one opening therein for receiving a member projecting from the bearing plate of the motor in a direction substantially parallel to the shaft thereof.

2. The improvement defined in claim 1 wherein said zones of said element are made of the same material.

3. The improvement defined in claim 2 wherein the differing energy loss factors of said zones result from different degrees of prestressing of said material.

4. The improvement defined in claim 2 wherein the differing energy loss factors of said zones result from a differing form elasticity of said material.

5. The improvement defined in claim 1 wherein each of said zones of said element is made of a piece of a different material having a different elasticity, said pieces being secured together.

6. The improvement defined in claim 1 wherein said one zone is circular in shape, said improvement further comprising bracket means for holding said element, said bracket means having a disc-shaped indentation for supporting said one zone and at least one frame attached thereto for supporting said side members of said element.

7. The improvement defined in claim 1 wherein said side members include at least one lateral protrusion means, extending into said at least one opening, for holding the respective received one of said projecting members.